(12) United States Patent
Igashira et al.

(10) Patent No.: US 7,949,895 B2
(45) Date of Patent: May 24, 2011

(54) DATA READING METHOD

(75) Inventors: Atsushi Igashira, Kawasaki (JP); Hideo Takahashi, Kawasaki (JP); Yoshihito Konta, Kawasaki (JP); Norihide Kubota, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 281 days.

(21) Appl. No.: 12/259,664

(22) Filed: Oct. 28, 2008

(65) Prior Publication Data
US 2009/0119453 A1 May 7, 2009

(30) Foreign Application Priority Data
Nov. 5, 2007 (JP) ................................ 2007-287875

(51) Int. Cl.
*G06F 11/00* (2006.01)
(52) U.S. Cl. ............................................ 714/6; 714/11
(58) Field of Classification Search .................. 714/6, 5, 714/7–10, 11, 12
See application file for complete search history.

(56) References Cited

U.S. PATENT DOCUMENTS

| | | | |
|---|---|---|---|
| 5,463,758 A | 10/1995 | Ottesen | |
| 5,613,088 A * | 3/1997 | Achiwa et al. | 711/155 |
| 5,960,169 A * | 9/1999 | Styczinski | 714/6 |
| 5,974,503 A * | 10/1999 | Venkatesh et al. | 711/114 |
| 6,519,677 B1 * | 2/2003 | Fuente | 711/112 |
| 7,370,148 B2 * | 5/2008 | Ikeuchi et al. | 711/114 |
| 7,386,758 B2 * | 6/2008 | Kitamura | 714/6 |
| 7,395,451 B2 * | 7/2008 | Takahashi et al. | 714/5 |
| 2006/0200697 A1 * | 9/2006 | Ito | 714/6 |
| 2007/0198721 A1 * | 8/2007 | Ikawa et al. | 709/226 |
| 2010/0031000 A1 * | 2/2010 | Flynn et al. | 711/216 |

FOREIGN PATENT DOCUMENTS

| | | |
|---|---|---|
| JP | 7-56688 | 3/1995 |
| JP | 2001-249770 | 9/2001 |
| JP | 2002-23962 | 1/2002 |
| JP | 2003-150324 | 5/2003 |

* cited by examiner

Primary Examiner — Dieu-Minh Le
(74) Attorney, Agent, or Firm — Staas & Halsey LLP

(57) ABSTRACT

According to an aspect of an embodiment, a method for controlling a controller connected to a plurality of storage units which are arranged in a redundant configuration, the controller reading data stored in the plurality of storage units in accordance with requests received from a host computer, the method comprising the steps of: receiving requests to read data successively from one of the storage units from the host computer; reading a part of requested target data from said one of the storage units; reading associated data and parity data stored in other storage units corresponding to other part of requested target data; generating other part of requested target data on the basis of the associated data and the parity data read out from the other storage units; and transmitting the part of the target data and the other part of the target data to the host computer.

15 Claims, 11 Drawing Sheets

| Disk / Stripe | 11 | 12 | 13 | 14 |
|---|---|---|---|---|
| 1 | D11 | D12 | D13 | P10 |
| 2 | D21 | D22 | P20 | D23 |
| 3 | D31 | P30 | D32 | D33 |
| 4 | P40 | D41 | D42 | D43 |
| 5 | D51 | D52 | D53 | P50 |
| 6 | D61 | D62 | P60 | D63 |
| 7 | D71 | P70 | D72 | D73 |
| 8 | P80 | D81 | D82 | D83 |
| 9 | D91 | D92 | D93 | D90 |

| Disk / Stripe | 11 | 12 | 13 | 14 |
|---|---|---|---|---|
| 1 | D11 | D31 | D31 | P10 |
| 2 | D21 | D22 | P20 | D23 |
| 3 | D31 | P30 | D32 | D33 |
| 4 | P40 | D41 | D42 | D43 |
| 5 | D51 | D52 | D53 | P50 |
| 6 | D61 | D62 | D60 | D63 |
| 7 | D71 | P70 | D72 | D73 |
| 8 | P80 | D81 | D82 | D83 |
| 9 | D91 | D92 | D93 | D90 |

⋮

| Disk / Stripe | 11 | 12 | 13 | 14 |
|---|---|---|---|---|
| 1 | D11 | D12 | D13 | P10 |
| 2 | D21 | D22 | P20 | D23 |
| 3 | D31 | P30 | D32 | D33 |
| 4 | P40 | D41 | D42 | D43 |
| 5 | D51 | D52 | D53 | P50 |
| 6 | D61 | D62 | P60 | D63 |
| 7 | D71 | P70 | D72 | D73 |
| 8 | P80 | D81 | D82 | D83 |
| 9 | D91 | D92 | D93 | D90 |

⋮

| Disk / Stripe | 11 | 12 | 13 | 14 |
|---|---|---|---|---|
| 1 | D11 | D12 | D13 | P10 |
| 2 | D21 | D22 | D20 | D23 |
| 3 | D31 | P30 | D32 | D33 |
| 4 | P40 | D41 | D42 | D43 |
| 5 | D51 | D52 | D53 | P50 |
| 6 | D61 | D62 | P60 | D63 |
| 7 | D71 | P70 | D72 | D73 |
| 8 | P80 | D81 | D82 | D83 |
| 9 | D91 | D92 | D93 | P90 |

| Disk / Stripe | 11 | 12 | 13 | 14 |
|---|---|---|---|---|
| 1 | D11 | D12 | Q10 | `P10 |
| 2 | D21 | Q20 | P20 | D22 |
| 3 | Q30 | P30 | D31 | D32 |
| 4 | P40 | D41 | D42 | Q40 |
| 5 | D51 | D52 | Q50 | P50 |
| 6 | D61 | Q60 | P60 | D62 |
| 7 | Q70 | P70 | D71 | D72 |
| 8 | P80 | D81 | D82 | Q80 |
| 9 | D91 | D92 | Q90 | P90 |

| Stripe \ Disk | 11 | 12 | 13 | 14 |
|---|---|---|---|---|
| 1 | D11 | D12 | Q10 | P10 |
| 2 | D21 | Q20 | P20 | D22 |
| 3 | Q30 | P30 | D31 | D32 |
| 4 | P40 | D41 | D42 | Q40 |
| 5 | D51 | D52 | Q50 | P50 |
| 6 | D61 | Q60 | P60 | D62 |
| 7 | Q70 | P70 | D71 | D72 |
| 8 | P80 | D81 | D82 | Q80 |
| 9 | D91 | D92 | Q90 | P90 |

READ REQUEST

| Disk<br>Stripe | 11 | 12 | 13 | 14 |
|---|---|---|---|---|
| 1 | D11 | D12 | Q10 | P10 |
| 2 | D21 | Q20 | P20 | D22 |
| 3 | Q30 | P30 | D31 | D32 |
| 4 | P40 | D41 | D42 | Q40 |
| 5 | D51 | D52 | Q50 | P50 |
| 6 | D61 | Q60 | P60 | D62 |
| 7 | Q70 | P70 | D71 | D72 |
| 8 | P80 | D81 | D82 | Q80 |
| 9 | D91 | D92 | Q90 | P90 |

DATA READING METHOD

BACKGROUND

1. Technical Field

This technique relates to a disk array apparatus that includes multiple hard disk drives constituting a RAID (redundant arrays of inexpensive disks) group for creating parity for each stripe and controls access requests to hard disk drives made by the host, a disk array apparatus control method, a disk array apparatus control program, and a disk array controller. In particular, the technique relates to a disk array apparatus, a disk array apparatus control method, a disk array apparatus control program, and a disk array controller that each improve the capability to perform read processes on hard disk drives using a simple process without running out of disk space.

2. Description of the Related Art

Large-scale computer systems have managed data using a dedicated data input/output unit provided independently of the host computer. Among such data input/output units, a disk array apparatus includes multiple hard disk drives (storage media), which constitute a RAID group. Thus, the reliability of data handled by the apparatus as well as the apparatus's capability to access the hard disk drives is improved.

RAID is classified into RAID levels corresponding to the levels of rapidity or fault tolerance. One of RAID levels being used commonly at present is RAID 5. RAID 5 is intended to switch between hard disk drives that are assigned the storage of an error correcting code called "parity" and hard disk drives that are assigned the storage of data, for each stripe. Thus, a disk array apparatus in which RAID 5 is implemented improves fault tolerance, increases the capacity, and speeds up read processes.

As the amounts of data handled by computer systems are increased in recent years, the amounts of data held by disk array apparatuses have also been increased. Such a disk array apparatus is often accessed intensively. Although RAID 5 allows a disk array apparatus to speed up read processes, the apparatus's capability to perform read processes is naturally reduced if the disk array apparatus is intensively accessed. As the information technology progresses day by day, computer systems including a disk array apparatus are always required to enhance their capabilities. Under the circumstances, disk array apparatuses are required to sufficiently demonstrate their capabilities even if they are intensively accessed.

In view of the foregoing, a technology regarding an improvement in a capability of a disk array apparatus is disclosed in Laid-open Japanese Patent Application Publication No. 2003-150324. Specifically, a technology for improving the capability to perform read processes by providing a swap area in each RAID group and saving a frequently accessed data block in the swap area is disclosed in Japanese Laid-open Patent Publication No. 2003-150324.

However, the technology disclosed in Japanese Laid-open Patent Publication No. 2003-150324 has a problem that the disk space is pressed and a problem that a complicated process must be performed. Specifically, the technology disclosed in Japanese Laid-open Patent Publication No. 2003-150324 has a problem that since a swap area is provided for each RAID group, the disk space for storing user data is reduced and a problem that since the access frequency is monitored periodically by counting the number of accesses for each data block, the number of processes is increased so that the processing capability as a whole may be reduced.

In view of the foregoing, a significant challenge to a disk array apparatus in which RAID 5 being used commonly at present is implemented is to improve the capability to perform read processes using a simple process without running out of disk space.

SUMMARY

According to an aspect of an embodiment, a method for controlling a controller connected to a plurality of storage units which are arranged in a redundant configuration, the controller reading data stored in the plurality of storage units in accordance with requests received from a host computer, the method comprising the steps of: receiving requests to read data successively from one of the storage units from the host computer; reading a part of requested target data from said one of the storage units; reading associated data and parity data stored in other storage units corresponding to other part of requested target data; generating other part of requested target data on the basis of the associated data and the parity data read out from the other storage units; and transmitting the part of the target data and the other part of the target data to the host computer.

DESCRIPTION OF THE PREFERRED EMBODIMENTS

Now, a disk array apparatus, a disk array apparatus control method, a disk array apparatus control program, and a disk array controller according to an embodiment will be described in detail with reference to the accompanying drawings. First, read processes performed by a related-art disk array apparatus and read processes performed by the disk array apparatus according to this embodiment will be described using two examples for each apparatus. Then, a configuration of the disk array apparatus according to this embodiment and process steps performed by the disk array apparatus will be described.

Embodiment

Figure 1:
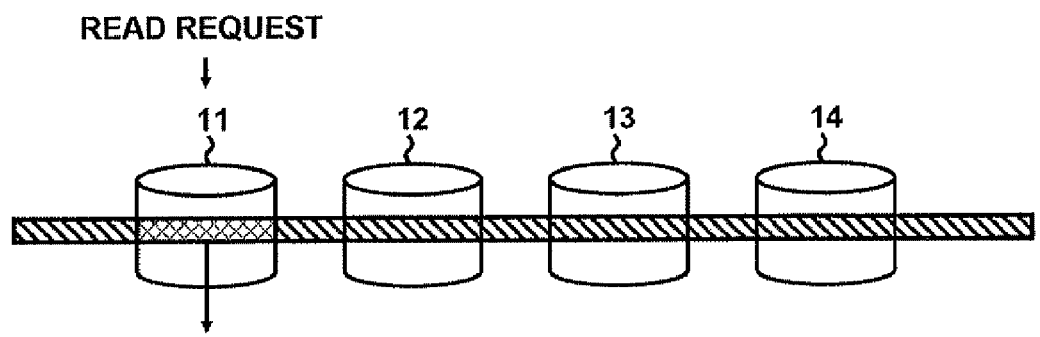
FIG. 1 is a diagram showing an example of read processes performed by a related-art disk array apparatus.

In order to clarify the features of the disk array apparatus according to this embodiment, read processes performed by the related-art disk array apparatus that has received multiple read requests to obtain data from an identical hard disk drive will be described. FIG. 1 is a diagram showing an example of read processes performed by the related-art disk array apparatus.

FIG. 1 shows hard disk drives 11 to 14 included in the related-art disk array apparatus. The hard disk drives 11 to 14 constitute RAID 5. The storage areas of the hard disk drives 11 to 14 are each divided into multiple logic blocks serving as units from or to which the host reads or writes data. In an example shown in FIG. 1, it is assumed that data D11, data D12, and parity P10 are each one logic block. The example shows that data is stored in logic blocks starting with "D," such as data D11 and data D12, and parity is stored in logic blocks starting with "P," such as parity P10 and parity P20.

Also, the hard disk drives 11 to 14 physically successively store data and parity in the order shown in FIG. 1. For example, the hard disk drive 11 physically successively stores data D11 to D31, parity P40, data D51 to D71, parity P80, and data D91.

As shown in FIG. 1, RAID 5 divides the hard disk drives into a hard disk drive that is assigned the storage of parity and hard disk drives that are assigned the storage of data, for each stripe. For example, in the first stripe (hereafter, an n-th stripe will be referred to as "stripe N"), the hard disks units 11 to 13 are assigned the storage of data and the hard disk drive 14 is assigned the storage of parity. In stripe 2, the hard disks units 11, 12, and 14 are assigned the storage of data and the hard disk drive 13 is assigned the storage of parity.

Parity is created by performing an exclusive OR operation (XOR) on pieces of data stored in other hard disk drives in an identical stripe. For example, parity P10 is created by performing an exclusive OR operation on data D11, D12, and D13. Thus, even if one of the hard disk drives constituting RAID 5 suffers a failure, data stored in the failed hard disk drive is restored by previously storing parity created in the above-described way and operating an exclusive OR operation on other pieces of data stored in the same stripe and the parity. If the related-art disk array apparatus configured as described above receives an access request for data read or data write made by the host as a higher-order unit, the disk array apparatus executes the access request. For example, if the related-art disk array apparatus receives read requests from the host, the disk array apparatus obtains data stored in the hard disk drives 11 to 14 according to the read requests and then transmits the obtained data to the host.

At that time, depending on the contents of the read requests received from the host, the disk array apparatus may have to obtain pieces of data only from an identical hard disk drive. One of such cases is a case where, in the example shown in FIG. 1, the disk array apparatus successively receives a read request to obtain data D1, a read request to obtain data D31, a read request to obtain data D61, and a read request to obtain data D91 from the host. Note that, in FIG. 1, logic blocks from which the disk array apparatus is to obtain data are shown using oblique lines.

The disk array apparatus, in which RAID 5 is implemented, typically obtains pieces of data in a parallel manner from the hard disk drives 11 to 14. As a result, read processes are speeded up. However, as shown in FIG. 1, if the disk array apparatus successively receives read requests to obtain pieces of data from the hard disk drive 11, it cannot read the pieces of data in a parallel manner. This causes a problem that the apparatus's capability to perform read processes is reduced.

On the other hand, if the disk array apparatus according to this embodiment successively receives read requests to obtain data from an identical hard disk, the disk array apparatus performs control such that it obtains pieces of data from other hard disk drives in order to obtain target data stored in the identical hard disk drive, that is, it performs read processes in a parallel manner.

Figure 2:
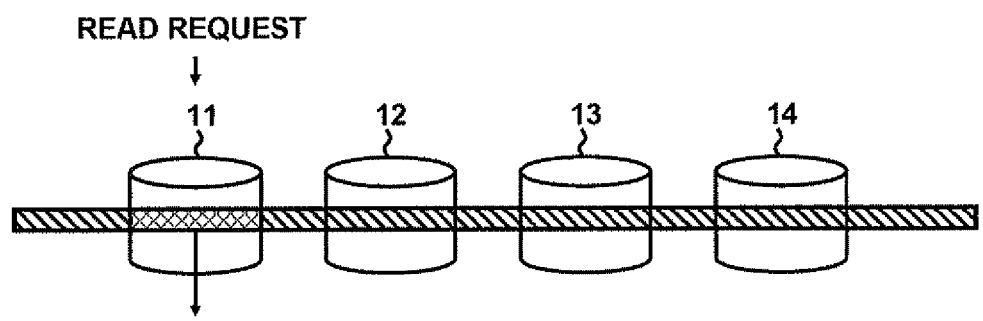
FIG. 2 is a diagram showing an example of read processes performed by a disk array apparatus according to an embodiment.

FIG. 2 is a diagram showing an example of read processes performed by the disk array apparatus according to this embodiment. In the example shown in FIG. 2, like in FIG. 1, it is assumed that multiple read requests received from the host are requests to obtain data D11, D31, D61, and D91 stored in the hard disk drive 11.

As shown in FIG. 2, when the disk array apparatus according to this embodiment executes the first read request (a read request to obtain data D11), it obtains the data 12, D13 and parity P10 from stripe 1 of the hard disk drives 12 to 14. As described above, the hard disk drives 11 to 14 constitute RAID 5. Therefore, by performing an exclusive OR operation on data D12, D13 and parity P10, the disk array apparatus obtains data D11.

When the disk array apparatus according to this embodiment executes a subsequent read request (a read request to obtain data D31), it obtains data D31 from stripe 3 of the hard disk drive 11. Further, when the disk array apparatus executes a subsequent read request (a read request to obtain data D61), it obtains data D62, parity P60, and data D63 from stripe 6 of the hard disk drives 12 to 14 and performs an exclusive OR operation on the obtained data D62, parity P60, and data D63. Thus, the disk array apparatus obtains data D61. Further, when the disk array apparatus executes a subsequent read request (read request to obtain data D91), it obtains data D91 from stripe 9 of the hard disk drive 11.

As is understood from the above-description, if the disk array apparatus according to this embodiment successively receives read requests to obtain data from an identical hard disk drive, it alternately performs read processes in which data is obtained by performing an exclusive OR operation and a read process in which data is obtained as specified by a read request each time the disk array apparatus executes one of the read requests. Thus, as shown in FIG. 2, the respective frequencies with which the hard disk drives 11 to 14 are accessed are equalized. As a result, the access load imposed on a particular hard disk drive is distributed. Also, the disk array apparatus obtains pieces of data in a parallel manner from the hard disk drives 11 to 14; therefore, the apparatus's capability to perform read processes is improved.

In this embodiment, each time the disk array apparatus executes "one" read request, it alternately performs read processes in which data is obtained by performing an exclusive OR operation and a read process in which data is obtained as specified by a read request. Alternatively, each time the disk array apparatus executes "multiple" read requests, it may perform read requests while switching between read processes in which data is obtained by performing an exclusive OR operation and read processes in each of which data is obtained as specified by a read request.

While read processes according to this embodiment are applied if the disk array apparatus receives the read request to obtain data D11, read request to obtain data D31, read request to obtain data D61, and read request to obtain data D91 in this order, read processes according to this embodiment are applied even if the disk arrays apparatus successively receives read requests to obtain pieces of data from an identical hard disk drive in any order.

Figure 3:
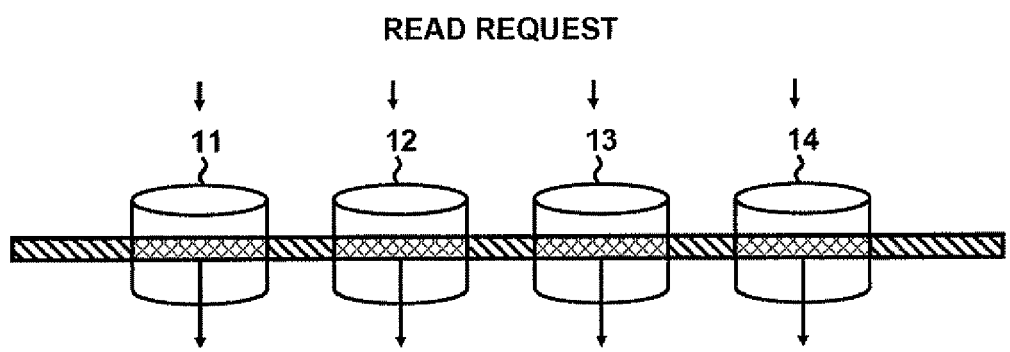
FIG. 3 is a diagram showing an example of read processes performed by the related-art disk array apparatus.

Hereafter, read processes performed by the related-art disk array apparatus that has received read requests to obtain pieces of data from multiple hard disk drives will be described. FIG. 3 is a diagram showing an example of read processes performed by the related-art disk array apparatus. In FIG. 3, like in FIG. 1, the related-art disk array apparatus includes the hard disk drives 11 to 14, which constitute RAID 5. FIG. 3 shows an example in which the disk array apparatus has received multiple read requests to obtain all pieces of data stored in stripes 1 to 9 of the hard disk drives 11 to 14. Specifically, the disk array apparatus has successively received a read request to obtain data D11, a read request to obtain data D12, a read request to obtain data D13, . . . , and a read request to obtain data D93. If data with a size larger than the data capacity of a logic block is stored in the hard disk drives 11 to 14, the disk array apparatus often successively receives read requests to obtain all pieces of data stored in a particular range of stripes as described above.

If the disk array apparatus receives read requests as described above, the respective frequencies with which the disk array apparatus accesses the hard disk drives 11 to 14 are equal to one another, as shown in FIG. 3. Thus, the access load is distributed. However, the disk array apparatus is allowed to access pieces of data physically successively stored in each hard disk drive with respect to only three stripes.

In the example shown in FIG. 3, the disk array apparatus obtains data D11, D21, and D31 stored in stripes 1 to 3 with respect to the hard disk drive 11, but it does not obtain parity P40. Subsequently, the disk array apparatus obtains data D51, D61, and D71 stored in stripes 5 to 7. That is, the disk array apparatus accesses only pieces of data corresponding to a maximum of three strips with respect to the hard disk drives 11 to 14. If the disk array apparatus accesses pieces of data that are not physically successively stored, the hard disk drives 11 to 14 may have to re-calculate a seek process. This causes a problem that the apparatus's capability to perform read processes is reduced.

On the other hand, if the disk array apparatus according to this embodiment successively receives read requests to obtain all pieces of data stored in a particular range of stripes, it performs control such that the respective frequencies with which the disk array apparatus accesses the hard disk drives 11 to 14 are equalized and such that the respective frequencies with which the disk array apparatus may access the hard disk drives 11 to 14 are increased.

Figure 4:
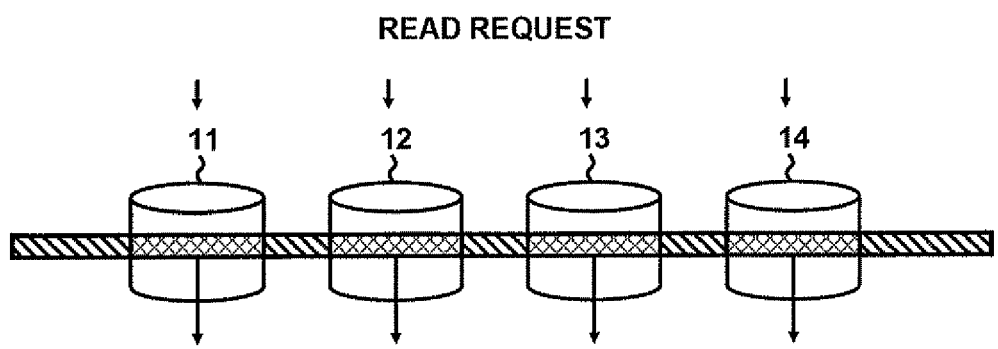
FIG. 4 is a diagram showing an example of read processes performed by the disk array apparatus according to this embodiment.

FIG. 4 is a diagram showing an example of read processes performed by the disk array apparatus according to this embodiment. In the example shown in FIG. 4, like in FIG. 3, it is assumed that the disk array apparatus has received read requests to obtain all pieces of data stored in strips 1 to 9 of the hard disk drives 11 to 14.

In this case, as shown in FIG. 4, the disk array apparatus according to this embodiment performs control such that it obtains pieces of data from the hard disk drives 12 to 14 with respect to stripes 1 to 3, obtains pieces of data from the hard disk drives 11, 13, and 14 with respect to stripes 4 to 6, and obtains pieces of data from the hard disk drives 11, 12, and 14 with respect to stripes 7 to 9.

Then, the disk array apparatus performs an exclusive OR operation on data D12, D13, and parity P10 obtained from the hard disk drives 12 to 14 with respect to stripe 1. Thus, the disk array apparatus obtains data D11, and then transmits data D11, D12, and D13 to the host. As such, the disk array apparatus performs exclusive OR operations with respect to stripes 2 to 9. Thus, the disk array apparatus obtains pieces of data specified by the read requests, and then transmits the obtained pieces of data to the host.

As a result, the number of stripes with respect to which the disk array apparatus according to this embodiment successively accesses one hard disk drive is increased. In the example shown in FIG. 4, the disk array apparatus successively accesses the hard disk drive 14 with respect to nine stripes. In this case, the frequency with which the disk array apparatus according to this embodiment accesses one hard disk drive is "triple" that in the related-art example shown in FIG. 3. Also, if the disk array apparatus accesses pieces of data with respect to stripe 9 and later in the same way, it successively accesses the hard disk drives 11 to 13 with respect to nine stripes, although not shown in FIG. 4. Thus, the respective frequencies with which the disk array apparatus successively accesses the hard disk drives 11 to 14 are increased so that the read processes performed by the disk array apparatus are speeded up.

Unlike in the read processes performed by the related-art disk array apparatus shown in FIG. 1 and FIG. 3, the read processes performed by the disk array apparatus according to this embodiment involve the exclusive OR operations. Therefore, it can be considered that the processing load imposed on a central processing unit (CPU) in the disk array apparatus is increased. However, the additional processing load imposed on the CPU due to performance of the exclusive OR operations is small. Therefore, even if such an additional processing load is imposed on the CPU, the apparatus's capability to perform read processes is improved by distributing the access load imposed on each hard disk drive and increasing the frequency with which the disk array apparatus successively accesses each hard disk drive.

As is understood from the above-description, the disk array apparatus according to this embodiment performs read processes while performing control such that if the disk array apparatus successively receives read requests to obtain pieces of data from an identical hard disk drive, the disk array apparatus obtains pieces of data from other hard disk drives in order to obtain target data stored in the identical hard disk drive and such that if the disk array apparatus successively receives read requests to obtain all pieces of data stored in a particular range of stripes, the respective frequencies with which the disk array apparatus accesses the hard disk drives are equalized and the respective frequencies with which the disk array apparatus successively access the hard disk drives are increased. As a result, the apparatus's capability to perform read processes on the hard disk drives constituting RAID 5 is improved. Also, when the disk array apparatus according to this embodiment performs read processes, it does not additionally provide a save area such as a swap area. Therefore, the hard disk drives do not run out of disk space. Further, when the disk array apparatus according to this embodiment performs read processes, it only controls logic blocks from which the disk array apparatus is to obtain data. With such a simple process, the apparatus's capability to perform read processes is improved.

Figure 5:
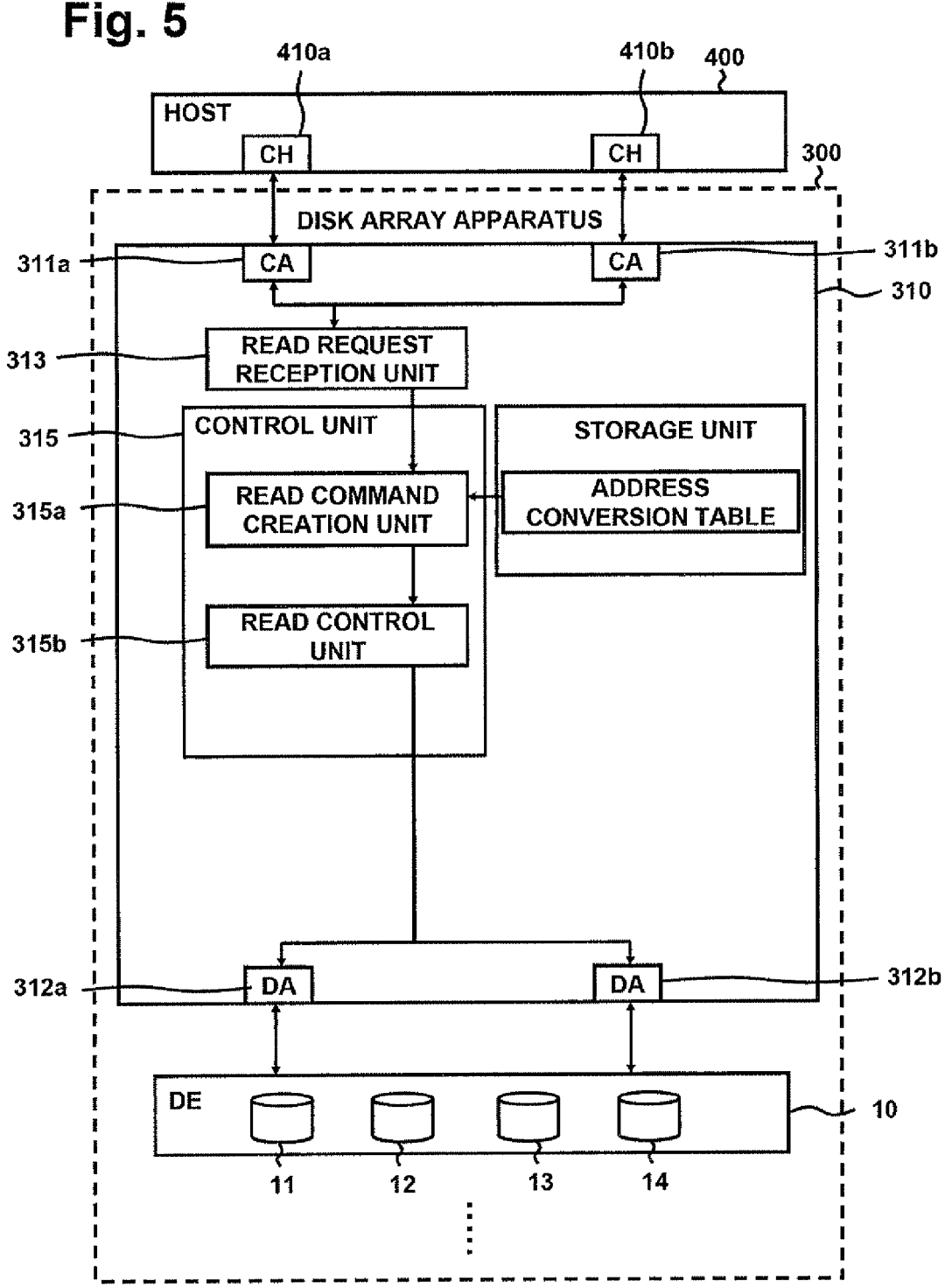
FIG. 5 is a functional block diagram showing a configuration of the disk array apparatus according to this embodiment.

Next, the disk array apparatus according to this embodiment will be described. FIG. 5 is a functional block diagram showing a configuration of the disk array apparatus according to this embodiment. As shown in FIG. 5, a disk array apparatus 300 is coupled to a host 400 and includes a DE (device enclosure) 10 and a CM (controller module) 310. While an example in which the disk array apparatus 300 includes only one CM 310 is shown in FIG. 5, the disk array apparatus may have a redundant configuration in which it includes two or more CMs. Also, in the example shown in FIG. 5, the disk array apparatus 300 includes only one DE; however, the number of DEs is not limited to one.

The host 400 is coupled to the disk array apparatus 300 via CHs (channel) 410a and 410b and transmits a request to read or write data to the disk array apparatus 300.

The DE 10 is an apparatus including multiple hard disk drives, that is, the hard disk drives 11 to 14. While the DE 10 includes four hard disk drives in the example shown in FIG. 5, the number of hard disk drives that the DE includes is not limited to four.

The hard disk drives 11 to 14 are storage devices such as magnetic disks. In the example shown in FIG. 5, it is assumed that the hard disk drives 11 to 14 constitute RAID 5. Note that the hard disk drives are not limited to magnetic disk drives and may be other storage devices such as thermomagnetic disk drives or optical magnetic disk drives.

Since the hard disk drives 11 to 14 constitute RAID 5, the host 400 makes an access request while recognizing the hard disk drives 11 to 14 not as individual hard disk drives but as one logic disk. For example, if the host 400 transmits a read request to the disk array apparatus 300, it specifies a logic block number that is the number of a logic block (also referred to as a "logic block address" or "logic address") in which target data is stored.

The CM 310 includes CAs (channel adapters) 311a and 311b, DAs (device adapters) 312a and 312b, a read request reception unit 313, and a storage unit 314, and a controller 315.

The CAs 311a and 311b are adapters for controlling communications between the disk array apparatus 300 and the host 400 as a higher-order apparatus and are coupled to the CHs 410a and 410b. DAs 312a and 312b are adapters for controlling communications between the CM 310 and DE 10.

The read request reception unit 313 is a storage device for sequentially storing read requests received from the host 400 and is, for example, a queue. The controller 315 to be described later takes out a read request stored in the read request reception unit 313 and performs a process corresponding to the read request.

The storage unit 314 is a storage device such as a hard disk or a nonvolatile memory and includes an address conversion table 314a related to this embodiment. The address conversion table 314a stores physical block numbers indicating the physical storage positions of pieces of data stored in the hard disk drives 11 to 14 in such a manner that the physical block numbers are associated with the logic block numbers of the hard disk drives 11 to 14.

The controller 315 is a controller for controlling the CM 310 as a whole and includes a read command creation unit 315a and a read control unit 315b related to this embodiment.

The read command creation unit 315a is a processor for analyzing read requests stored in the read request reception unit 313 and creating read commands according to the read requests. Specifically, the read command creation unit 315a reads read requests stored in the read request reception unit 313. Then, the read command creation unit 315a obtains physical block numbers corresponding to logic block numbers included in the read requests from the address conversion table 314a.

Then, the read command creation unit 315a determines whether there are two or more successive read requests to obtain pieces of data from an identical hard disk drive, according to the obtained physical block numbers. If there are such read requests, the read command creation unit 315a alternately creates read commands to obtain data by performing an exclusive OR operation and a read command to obtain data as specified by a read request with respect to each of the read requests.

Hereafter, the example shown in FIG. 2 will be used for explanation. If the read command creation unit 315a determines that the four read requests to obtain data D11, D31, D61, and D91 are successive, first, it creates three read commands to obtain data D12 and D13 and parity P10. Then, the read command creation unit 315a outputs the created three read commands to the read control unit 315b and instructs the read control unit 315b to execute the three read commands and then perform an exclusive OR operation on the obtained data D12 and D13 and parity P10 so as to obtain data D11.

Subsequently, the read command creation unit 315a creates a read command to obtain data D31, outputs the created read command to the read control unit 315b, and instructs the read control unit 315b to obtain data D31. Also, the read command creation unit 315a creates three read commands to obtain data D62, parity 60, and data D63, outputs the created three read commands to the read control unit 315b, and instructs the read control unit 315b to obtain data D61. Further, the read command creation unit 315a creates a read command to obtain data D91, outputs the created the read command to the read control unit 315b, and instructs the read control unit 315b to obtain data D91.

On the other hand, if there are no two or more successive read requests to obtain pieces of data from an identical hard disk drive, the read command creation unit 315a determines whether there are successive multiple read requests to obtain all pieces of data stored in a particular range of stripes.

Here, "a particular range of stripes" refers to a range of successive stripes such as stripes 1 to 9 shown in FIG. 4. That is, the multiple read requests to obtain all pieces of data stored in a particular range of stripes refer to multiple read requests to obtain all pieces of data physically successively stored in the hard disk drives 11 to 14.

If there are such successive read requests, the read command creation unit 315a creates read commands such that the respective frequencies with which the hard disk drives 11 to 14 are accessed are made equal and the respective frequencies with which the hard disk drives 11 to 14 are successively accessed are increased.

Specifically, first, the read command creation unit 315a determines the "unit number of read requests to be processed" used when processing the multiple read requests to obtain all pieces of data stored in a particular range of stripes.

The unit number of read requests to be processed is determined by multiplying a value (hereafter referred to as a "data storage number") obtained by subtracting the "number of hard disk drives storing parity in one stripe" from the "number of hard disk drives constituting a RAID group," by a value obtained by subtracting "1" from the "number of hard disk drives constituting a RAID group."

That is, the unit number of read requests to be processed is determined by $(X-Y) \times (X-1)$ where X is the "number of hard disk drives constituting a RAID group" and Y is the "number of hard disk drives storing parity in one stripe."

For example, as shown in FIG. 4, if four hard disk drives constitute RAID 5, X is "4" and Y is "1." Therefore, "9" that is the operation result of $(4-1) \times (4-1)$ is obtained as the unit number of read requests to be processed.

When the read command creation unit 315a processes read requests corresponding to the obtained unit number of read requests to be processed, it creates read commands to obtain pieces of data from identical hard disk drives corresponding to the data storage number. In other words, the read command creation unit 315a data handles a hard disk drive(s) corresponding to the "number (one in the case of RAID 5) of hard disk drives storing parity in one stripe," as a hard disk drive(s) from which no data is to be read.

Subsequently, when the read command creation unit 315a processes read requests corresponding to the subsequent unit number of read requests to be processed, it also creates read commands to obtain pieces of data from identical hard disk drives corresponding to the data storage number. At that time, the read command creation unit 315a handles, as a hard disk drive from which no data is to be read, a hard disk drive adjacent to the hard disk drive handled as a hard disk drive from which no data is to be read when previously processing the read requests corresponding to the unit number of read requests to be processed.

In the example shown in FIG. 4, the unit number of read requests to be processed is "9". Therefore, with respect to nine read requests to be processed first, the read command creation unit 315a creates read commands to obtain pieces of data from the hard disk drives 12 to 14 and handles the hard disk drive 11 as a hard disk drive from which no data is to be read. With regard to nine read requests to be processed next, the read command creation unit 315a creates read commands to obtain pieces of data from the hard disk drives 11, 13, and 14 while handling, as a hard disk drive from which no data is to be obtained, the hard disk drive 12 adjacent to the hard disk drive 11 previously handled as such a hard disk.

As is understood from the above-description, each time the read command creation unit 315a processes read requests corresponding to the unit number of read requests to be processed, the read command creation unit 315a creates read commands while handling, as a hard disk drive from which no data is to be read, a hard disk drive adjacent to a hard disk drive previously handled as such a hard disk drive. The read command creation unit 315a creates read commands for each stripe and outputs the created read commands to the read control unit 315b. For example, with regard to strip 1, the read command creation unit 315a creates three read commands to obtain data D12 and D13 and parity P10, outputs the created three read commands to the read control unit 315b, and instructs the read control unit 315b to obtain data D11, D12, and D13.

Hereafter, processes performed by the read command creation unit 315a in a case where there are successive read requests to obtain pieces of data stored in a particular range of stripes will be described using the example shown in FIG. 4. When the read command creation unit 315a determines that 27 read requests to obtain data D11 to D13, D21 to D23, . . . , D91 to D93 are successive, it first obtains "9" as the unit number of read requests to be processed. Subsequently, with regard to nine read requests (nine read requests to obtain data D11 to D13, D21 to D23, and D31 to D33) to be processed first, the read command creation unit 315a creates read commands to obtain pieces of data from the hard disk drives 12 to 14.

At that time, the read command creation unit 315a creates read commands for each stripe; therefore, first, the read command creation unit 315a creates three read commands to obtain data D12 and D13 and parity P10 in order to obtain data D11 to D13 stored in stripe 1. Then, the read command creation unit 315a outputs the created three read commands to the read control unit 315b and instructs the read control unit 315b to obtain data D11 to D13.

As such, the read command creation unit 315a creates three read commands to obtain data D22, parity P20, and D23 in order to obtain data D21 to D23 stored in stripe 2. Then, the read command creation unit 315a outputs the created three read commands to the read control unit 315b and instructs the read control unit 315b to obtain data D21 to D23. Also, the read command creation unit 315a creates similar read commands with respect to stripe 3 and instructs the read control unit 315b to obtain data D31 to D33.

With regard to nine read requests (nine read requests to obtain data D41 to D43, D51 to D53, and D61 to D63) to be processed subsequently, the read command creation unit 315a handles, as a hard disk drive from which no data is to be obtained, the hard disk drive 12 adjacent to the hard disk drive 11 handled as such a hard disk when previously processing the nine read requests. In other words, the read command creation unit 315a creates read commands to obtain pieces of data from the hard disk drives 11, 13, and 14.

Like when processing the first nine read requests, with respect to stripes 4 to 6, the read command creation unit 315a creates read commands to obtain pieces of data stored in each stripe. As for nine read requests to be processed subsequently, the read command creation unit 315a creates read commands to obtain pieces of data from the hard disk drives 11, 12, and 14 while handling the hard disk drive 13 as a hard disk drive from which no data is to be obtained.

In this way, the read command creation unit 315a creates read commands with respect to the successive read requests to obtain all pieces of data stored in a particular range of stripes.

On the other hand, if there are no two or more successive read requests to obtain data from an identical hard disk drive and if there are no successive read requests to obtain all pieces of data stored in a particular range of stripes, the read command creation unit 315a creates read commands including physical addresses corresponding to logic blocks specified by the read requests.

Subsequently, the read command creation unit 315a outputs the created read commands to the read control unit 315b. The read control unit 315b receives the read commands and executes the received read commands to obtain pieces of data from the hared disk units 11 to 14. Then, the read control unit 315b transmits the obtained pieces of data to the host 400 via the CA 311a and 311b.

If the read control unit 315b is given an instruction for performing an exclusive OR operation by the read command creation unit 315a, it performs an exclusive OR operation according to the instruction so as to obtain data.

For example, if the read control unit 315b are given an instruction for obtaining data D11 as well as three read commands to obtain data D12 and D13 and parity P10 in the example shown in FIG. 2, it executes the given three read commands so as to obtain data D12 and D13 and parity P10. Then, the read control unit 315b performs an exclusive OR operation on the obtained data D12 and D13 and parity P10 so as to obtain data D11 and transmits the obtained data D11 to the host 400.

Also, for example, if the read control unit 315b are given an instruction for obtaining data D11 to D13 as well as three read commands to obtain data D12 and D13 and parity P10 in the example shown in FIG. 4, it executes the received three read commands so as to obtain data D12 and D13 and parity P10. Then, the read control unit 315b performs an exclusive OR operation on the obtained data D12 and D13 and parity P10 so as to obtain data D11 and transmits the obtained data D11 to D13 to the host 400.

Figure 6:
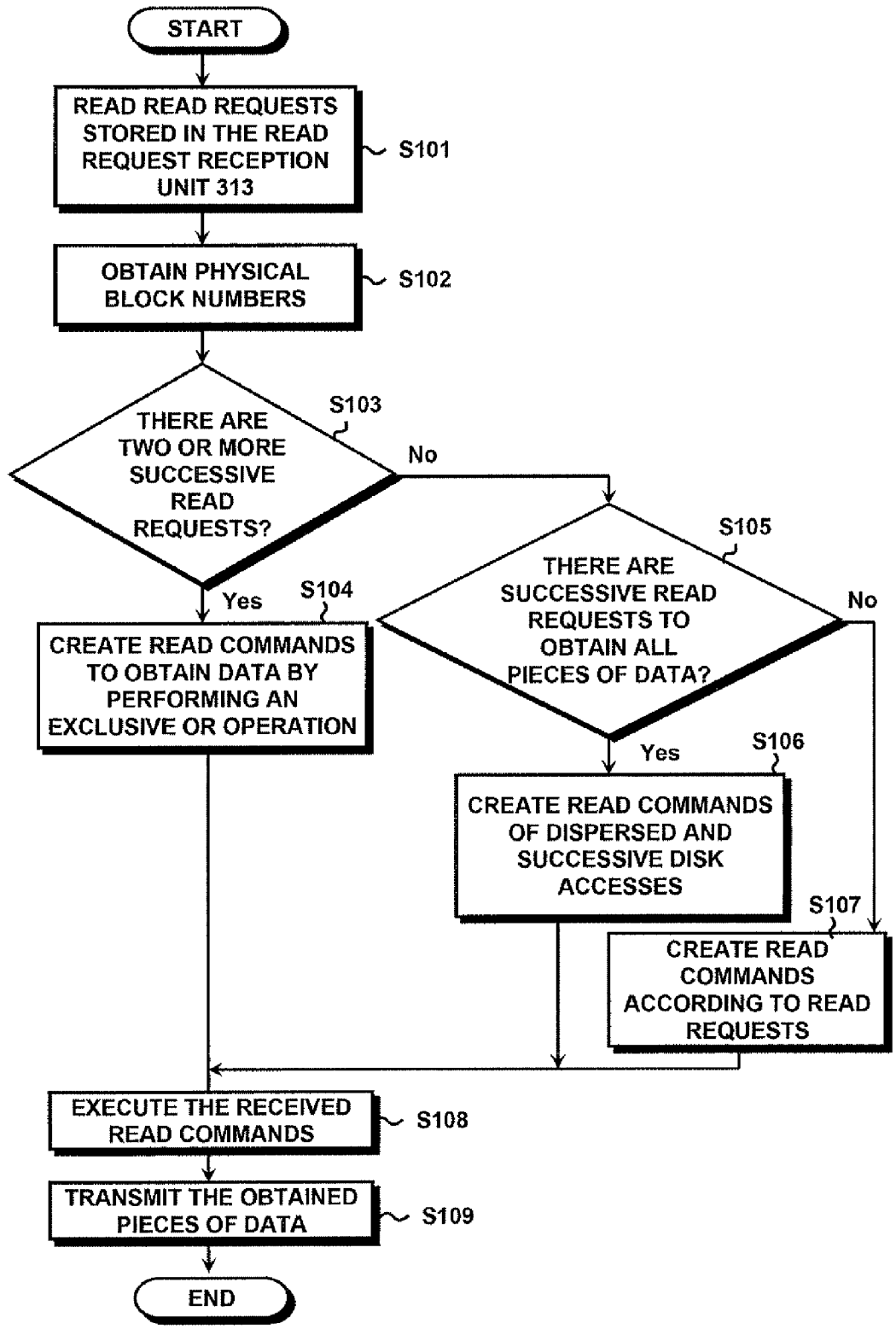
FIG. 6 is a flowchart showing steps of a read process performed by the disk array apparatus according to this embodiment.

Hereafter, a read process performed by the disk array apparatus 300 according to this embodiment will be described. FIG. 6 is a flowchart showing steps of a read process performed by the disk array apparatus 300 according to this embodiment.

As shown in FIG. 6, the read command creation unit 315a of the disk array apparatus 300 reads read requests stored in the read request reception unit 313 (step S101). Subsequently, the read command creation unit 315a obtains physical block numbers corresponding to logic block numbers included in the read requests from the address conversion table 314a (step S102).

Subsequently, the read command creation unit 315a analyzes the read requests according to the obtained physical block numbers. If there are two or more successive read requests to obtain pieces of data from an identical hard disk drive (YES in step S103), the read command creation unit 315a alternately creates read commands to obtain data by performing an exclusive OR operation and a read command to obtain data as specified by a read request, so that disk accesses are distributed (step S104).

On the other hand, if there are no two or more successive read requests to obtain pieces of data from an identical hard disk drive (NO in step S103) and if there are successive read requests to obtain all pieces of data stored in a particular range of stripes (YES in step S105), the read command creation unit 315a creates read commands such that the respective frequencies with which the hard disk drives 11 to 14 are accessed are equalized and such that the respective frequencies with which the hard disk drives 11 to 14 are successively accessed are increased (step S106).

On the other hand, if there are no two or more successive read requests to obtain pieces of data from an identical hard disk drive (NO in step S103) and if there are no successive read requests to obtain all pieces of data stored in a particular range of stripes (NO in step S105), the read command creation unit 315a creates read commands to obtain pieces of data as specified by the read requests (step S107).

The read control unit 315b receives the read commands from the read command creation unit 315a, executes the received read commands so as to obtain pieces of data from the hard disk drives 11 to 14 (step S108), and transmits the obtained pieces of data to the host 400 via the CAs 311a and 311b (step S109).

As described above, in the disk array apparatus 300 according to this embodiment, the read command creation unit 315a analyzes read requests and if there are two or more successive read requests to obtain pieces of data from an identical hard disk drive, the read command creation unit 315a alternately creates read commands to obtain data by performing an exclusive OR operation and a read command to obtain data as specified by a read request. Also, if there are successive read requests to obtain all pieces of data stored in a particular range of stripes, the read command creation unit 315a creates read commands such that the respective frequencies with which the hard disk drives 11 to 14 are accessed are equalized and such that the respective frequencies with which the hard disk drives 11 to 14 are successively accessed are increased. As a result, the apparatus's capability to perform read processes on the hard disk drives constituting RAID 5 is improved.

In this embodiment, if there are two or more successive read requests to obtain pieces of data from an identical hard disk drive, pieces of data are obtained from hard disk drives other than the identical hard disk drive. In addition thereto, if there are two or more successive read requests to obtain pieces of data from two hard disk drives, pieces of data may be obtained from hard disk drives other than the two hard disk drives.

Also, in this embodiment, the example in which the hard disk drives 11 to 14 constitute RAID 5 is shown. However, the hard disk drives may constitute RAID 6 that stores horizontal parity (P) and weighting parity (Q) for each stripe.

Figure 7:
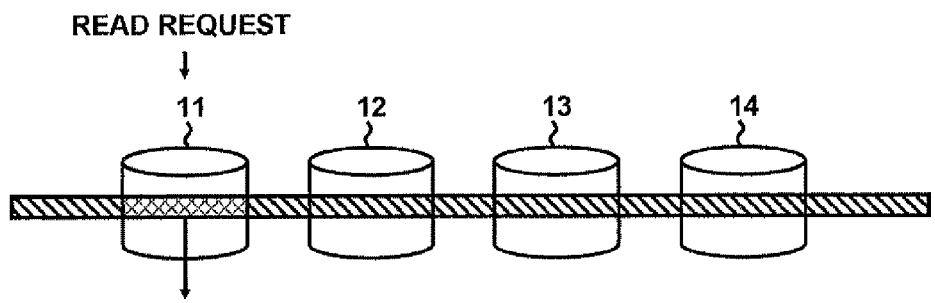
FIG. 7 is a diagram showing an example of read processes performed by the related-art disk array apparatus in which RAID 6 is constituted.

FIG. 7 is a diagram showing an example of read processes performed by the related-art disk array apparatus in which RAID 6 is constituted. In the example shown in FIG. 7, the hard disk drives 11 to 14 constitute RAID 6, which stores horizontal parity P and weighting parity Q for each stripe. In this case, if the related-art disk array apparatus receives read requests to obtain data D11, D51, D61, and D91 from the host 400, it cannot read pieces of data in a parallel manner. As a result, the apparatus's capability to perform read processes is reduced.

Figure 8:
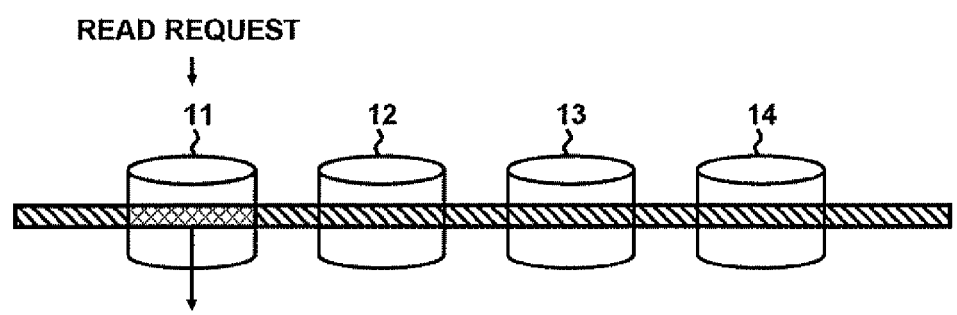
FIG. 8 is a diagram showing an example of read processes performed by the disk array apparatus according to this embodiment in which RAID 6 is constituted.

FIG. 8 is a diagram showing an example of read processes performed by the disk array apparatus according to this embodiment in which RAID 6 is constituted. Here, like in the example shown in FIG. 7, it is assumed that the disk array apparatus according to this embodiment has received read requests to obtain data D11, D51, D61, and D91 from the host 400. As shown in FIG. 8, the disk array apparatus performs control so that the respective frequencies with which the hard disk drives 11 to 14 are accessed are equalized. As a result, access loads imposed on the hard disk drives 11 to 14 are made uniform.

Figure 9:
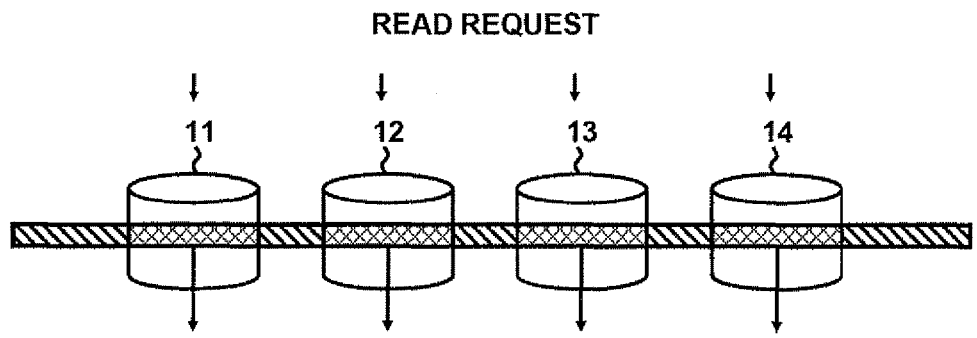
FIG. 9 is a diagram showing an example of read processes performed by the related-art disk array apparatus in which RAID 6 is constituted.

FIG. 9 is a diagram showing an example of read processes performed by the related-art disk array apparatus in which RAID 6 is constituted. In the example shown in FIG. 9, it is assumed that the disk array apparatus has successively received read requests to obtain all pieces of data stored in stripes 1 to 9. In such a case, the disk array apparatus successively accesses each of the hard disk drives 11 to 14 with respect to a maximum of two stripes.

Figure 10:
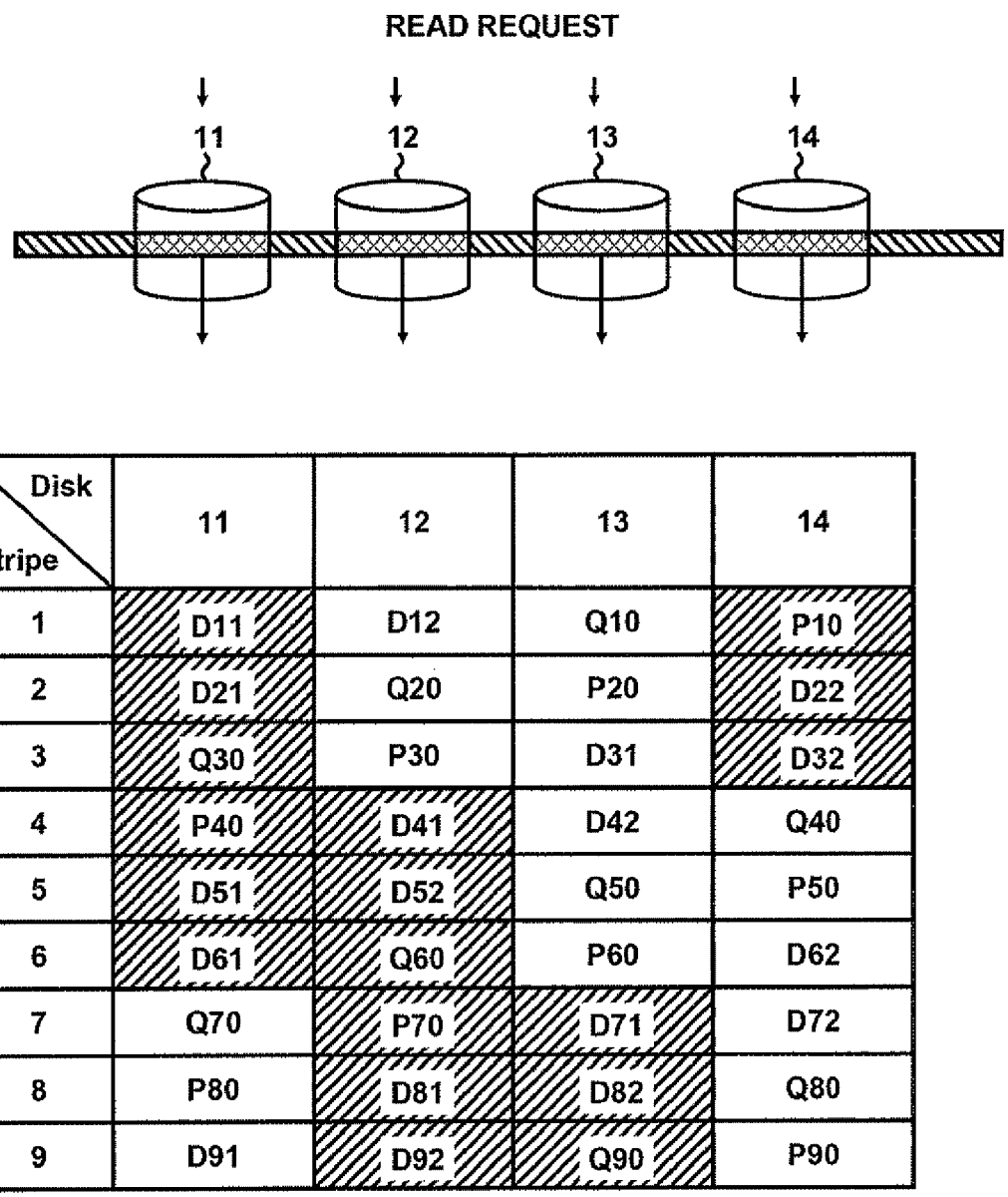
FIG. 10 is a diagram showing an example of read processes performed by the disk array apparatus according to this embodiment in which RAID 6 is constituted.

FIG. 10 is a diagram showing an example of read processes performed by the disk array apparatus according to this embodiment in which RAID 6 is constituted. Here, like in the example shown in FIG. 9, it is assumed that the disk array apparatus has successively received read requests to obtain all pieces of data stored in stripes 1 to 9. As shown in FIG. 10, the disk array apparatus performs control so that the respective frequencies with which the hard disk drives 11 to 14 are accessed are equalized and so that the respective frequencies with which the hard disk drives 11 to 14 are successively accessed are increased, like in the case (see FIG. 4) where RAID 5 is constituted. In the example shown FIG. 10, the disk array apparatus successively accesses each of the hard disk drives 11 to 14 with respect to a maximum of six stripes. Accordingly, the frequency with which each hard disk drive is successively accessed becomes triple that in the related-art example shown in FIG. 9.

Figure 11:
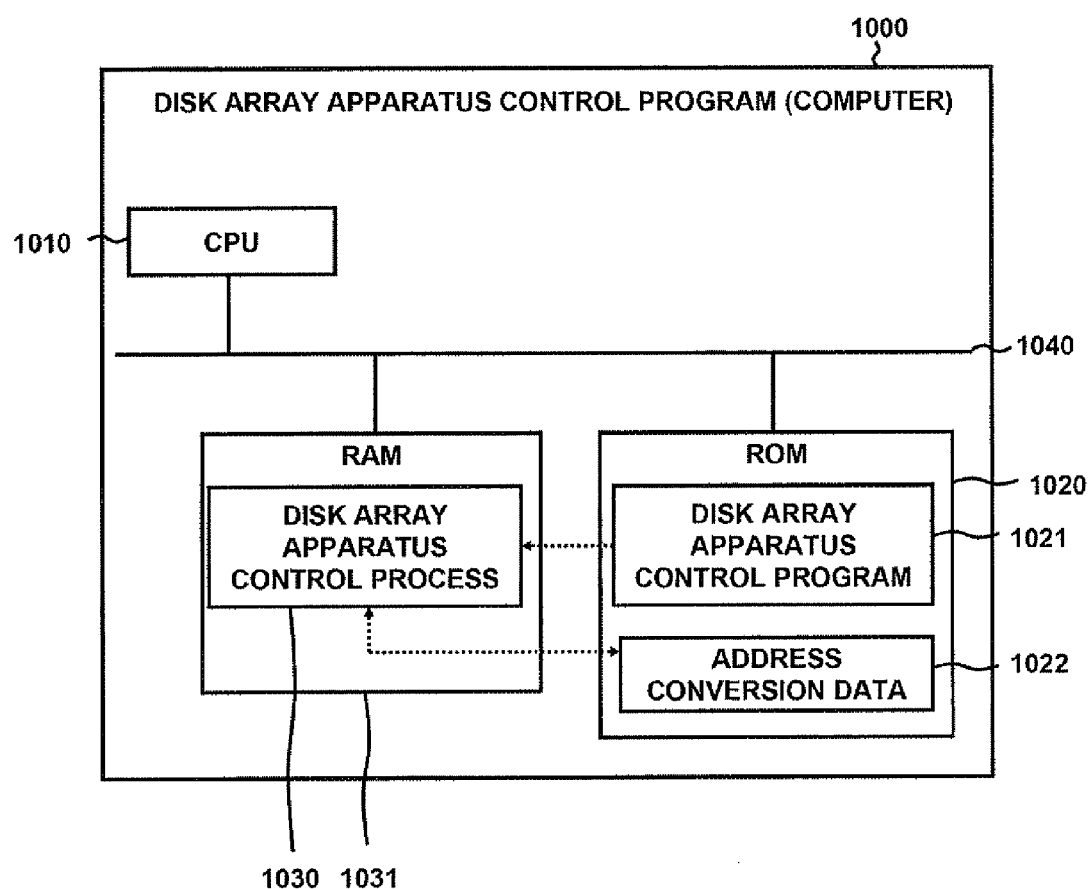
FIG. 11 is a diagram showing a computer for executing a disk array apparatus control program.

While the example in which the hard disk drives 11 to 14 constitute RAID 5 is shown in this embodiment, the hard disk drives may constitute RAID 3 or RAID 4 in which a hard disk drive for storing parity is not changed for each stripe or may constitute RAID 2 in which hamming code is stored instead of parity. Various processes described in this embodiment are realized by executing a previously prepared program using a computer such as a personal computer or a workstation. Referring now to FIG. 11, an example of a computer for executing a disk array apparatus control program having functions similar to those of this embodiment will be described. FIG. 11 is a diagram showing a computer for executing a disk array apparatus control program.

As shown in FIG. 11, a computer 1000 includes a CPU 1010 as an operation means for performing various operation processes, a ROM (read only memory) 1020 as a nonvolatile memory, and a RAM (random access memory) 1030 for temporarily storing various types of information. The CPU 1010, ROM 1020, and RAM 1030 are coupled to one another via a bus 1040.

The ROM 1020 stores a disk array apparatus control program 1021 having functions similar to those of the controller 315 shown in FIG. 5 and address conversion data 1022 corresponding to the address conversion table 314a shown in FIG. 5.

The CPU 1010 reads the disk array apparatus control program 1021 from the ROM 1020 and then loads the read program into the RAM 1030. Thus, the disk array apparatus control program 1021 serves as a disk array apparatus control process 1031. Then, the disk array apparatus control process 1031 loads information or the like read from the address conversion data 1022 into an area of the RAM 1030 assigned to the disk array apparatus control process 1031 as appropriate. Then, the disk array apparatus control process 1031 processes various types of data according to the loaded information or the like.

The disk array apparatus control program 1021 need not always be stored in the ROM 1020. For example, the disk array apparatus control program 1021 may be previously stored in a "transportable physical medium" inserted into the computer 1000, such as a flexible disk (FD), a CD-ROM, an MO disk, a DVD disk, an optical magnetic disk, or an IC card, a "fixed physical medium" provided inside or outside the computer 1000, such as a hard disk drive (HDD), or "another computer (or server)" coupled to the computer 1000 via a public line, the Internet, LAN, WAN, or the like, and then may be read and executed by the computer 1000.

Hereafter, appendixes with respect to the above-described embodiment will be disclosed.

What is claimed is:

1. A method for controlling a controller connected to a plurality of storage units which are arranged in a redundant configuration, the controller reading data stored in the plurality of storage units in accordance with read requests received from a host computer, the method comprising:
   detecting that the read requests received from the host computer are successive read requests to read data successively from a target storage unit;
   in the case that the successive read requests are detected,
      reading a part of requested target data from the target storage unit;
      reading associated data and parity data stored in other storage units, corresponding to another part of the requested target data;
      generating the another part of the requested target data on the basis of the associated data and the parity data read out from the other storage units; and
      transmitting the part of the requested target data and the another part of the requested target data to the host computer in accordance with the successive read requests.

2. The method according to claim 1, wherein when the controller receives a plurality of read requests to read the plurality of data stored in a particular range of stripes in the plurality of storage units, the controller reads the part of the requested target data and generates the another part of the requested target data on the basis of the associated data and the parity data read out from the other storage units so as to read requested target data and other than the requested target data and parity data successively from each storage unit.

3. The method according to claim 2, wherein the controller determines a predetermined number of read requests by multiplying a data storage number obtained by subtracting the number of storage units storing parity in the stripe from the number of the plurality of storage units, by a value obtained by subtracting one from the plurality of storage units.

4. The method according to claim 2, wherein the controller sets a number of the storage units which are not read target data to the number of storage units storing parity in the stripe.

5. The method according to claim 1, wherein the controller reads the requested target data and other than the requested target data each time a predetermined number of read requests are processed.

6. The method according to claim 1, further comprising:
   in case that the read requests received from the host computer are different from the successive read requests, reading the requested target data from the target storage unit, and transmitting the requested target data to the host computer in accordance with the read requests.

7. The method according to claim 1, further comprising:
   in case that the successive read requests are detected, generating a first command to read the part of the requested target data from the target storage unit and a second command to read the another part of the requested target data from the other storage units.

8. An apparatus for managing data in accordance with a request from a host computer, the apparatus comprising:
   a plurality of storage units to store the data, the plurality of storage units being arranged in a redundant configuration;
   a controller to control the plurality of storage units in accordance with a process comprising:
      detecting that the read requests received from the host computer are successive read requests to read data successively from a target storage unit;
      in case that the successive read requests are detected,
         reading a part of requested target data from the target storage unit;
         reading associated data and parity data stored in other storage units corresponding to another part of the requested target data;
         generating the another part of the requested target data on the basis of the associated data and the parity data read out from the other storage units; and
         transmitting the part of the requested target data and the another part of the requested target data to the host computer in accordance with the successive read requests.

9. The apparatus according to claim 8, wherein when the controller receives a plurality of read requests to read the plurality of data stored in a particular range of stripes in the plurality of storage units, the controller reads the part of the requested target data and generates the another part of the requested target data on the basis of the associated data and the parity data read out from the other storage units so as to read the requested target data and other than the requested target data and parity data successively from each storage unit.

10. The apparatus according to claim 9, wherein the controller determines a predetermined number of read requests from by multiplying a data storage number obtained by subtracting the number of storage unit storing parity in the stripe from the number of the plurality of storage units, by a value obtained by subtracting one from the plurality of storage units.

11. The apparatus according to claim 9, wherein the controller sets a number of the storage units which are not read target data to the number of storage units storing parity in the stripe.

12. The apparatus according to claim 8, wherein the controller reads the requested target data and other than the requested target data each time a predetermined number of read requests are processed.

13. The method according to claim 8, further comprising:

in case that the read requests received from the host computer are different from the successive read requests, reading the requested target data from the target storage unit, and transmitting the requested target data to the host computer in accordance with the read requests.

14. The method according to claim 8, wherein the process further comprises:
in case that the successive read requests are detected, generating a first command to read the part of the requested target data from the target storage unit and a second command to read the another part of the requested target data from the other storage units.

15. A method for controlling a controller connected to storage units arranged in a redundant configuration, comprising:
receiving read requests from a host computer;
determining whether the read requests received from the host computer are successive read requests to read data successively from a target storage unit included in the storage units, and if it is determined that successive read requests have been received:
reading a first part of requested target data from the target storage unit;
reading additional data stored in one or more of the storage units other than the target storage unit, the additional data corresponding to a second part of the requested target data;
generating the second part of the requested target data on the basis of the additional data read out from the storage units other than target storage unit; and
transmitting the first part of the requested target data and the second part of the requested target data to the host computer.

* * * * *